Patented May 19, 1942

2,283,290

UNITED STATES PATENT OFFICE 2,283,290

PROCESS FOR TREATING CITRUS FRUITS

Bailie N. Savage, Seattle, Wash.

No Drawing. Application August 1, 1940,
Serial No. 349,290

8 Claims. (Cl. 99—103)

My invention relates to a method or process for treating oranges, grapefruit, lemons or other citrus fruits, all of which have a thick peel or skin, to remove the oil from the peeling and also to remove the outer or surface portion of the peel together with any dirt or foreign material.

The purpose of my invention is to provide a new, novel, useful and practical means for the treatment of citrus fruit in large volume and quantity prior to the extraction of their juices in industrial, commercial or canning plants, also prior to their use for preserving or other purposes.

More particularly, the objects are (a) to remove the pungent oil and any other possible related or present substances of objectionable nature from the skin or peeling prior to use of the fruit for juice or other purposes, and (b) to remove the surface or outer portion of the skin or peel together with any accumulated dirt or foreign matter and also to thoroughly cleanse such outer surface of any insect or fungus life of any nature, so that a thoroughly clean and practically sterile product results, which may then be comminuted, chopped, cut, pressed or further treated as desired. Even in canning plants where the fruit is canned in segment or other form, it may possibly prove desirable to use this means of cleansing the fruit before removal of the peeling preparatory to canning.

Heretofore, in the production of citrus fruit juices, it has been the custom to remove the peeling before pressing the fruit, or else to halve the fruit and ream out or remove the juice, or else to wash and chop or comminute the fruit together with the peel and to then express the juice from this mass under pressure, in which event it was necessary to subsequently separate the oil from the juice. By these methods, or some of them, it has been found difficult to so handle the operation as to prevent contamination of the juice by the objectionable flavor of the oil and perhaps other properties present in the peel. And it must be remembered that, from the standpoint of nutritional values, it is desirable to include in the mass, before pressing, the white pulp directly beneath the colored peel, as this white pulp is exceptionally rich in vitamin C.

A primary object of my invention is to provide grapefruit, oranges or other citrus fruits so treated that substantially all of the oil is removed from the peeling and that the outer surface of the peel is removed, together with all dirt and foreign matter, in order that such fruit may either immediately or at some future time be used, without further removal of any portion of the skin, for the production of a juice of high quality. However, I do not limit the use of my process to the juice industry alone, as the citrus fruit so treated may prove to be well suited for other uses, either immediately after processing or subsequently thereto, and either with or without further removal of the remaining portion of the peel.

I have discovered that by subjecting citrus fruit to an intense flame or heat, the oil in the pooling is quickly liberated, dissipated and destroyed and that the outer surface of the peeling is somewhat blackened, charred, burned and blistered. This outer surface which has been burned and softened may then be removed or washed off by friction or brush or by water sprays under high pressure, under which treatment the surface may be thoroughly cleansed. For best results, it is my observation that the flame or heat should be quite intense and the exposure of the fruit thereto of short duration, as I have observed that longer exposure to the heat, even at lower temperatures, tends to unduly soften the body of the fruit beneath the peel, and excessive continuation of the heat treatment may also alter the quality of the juice adversely. Excessive heat or flame exposure will also tend to soften and weaken the peel to such extent that it may be subject to being torn or ruptured during the subsequent treatment under the high pressure water jets, whereas the peel must be kept intact to protect the fruit and its juice from leakage and loss. For the subsequent extraction of the juice, a moderate softening of the fruit beneath the peel will doubtless prove desirable for commercial juice plants. Together with the moderate softening and tenderizing of the peel and pulp beneath the outer surface of the peel which is removed, this softening of the fruit should facilitate the thorough extraction of juice from the fruit under pressure.

I accomplish the objects of my invention by subjecting the citrus fruit to an intense flame or heat for a period of several seconds, and thereafter subjecting such fruit to the action of impinging jets or sprays of water under high pressure to remove the outer surface which has been softened and blistered by the heat. The temperature may be as low as 500° F. or as high as 3000° F. or higher, but for the best practical results, I find a good working temperature to be between 1500° F. and 2000° F.

Any suitable means for providing the heat may be used, such as electricity, oil or gas, but I find that the application of an intense gas flame directly upon the fruit is preferable, such as the flame in a retort or blast furnace under the pressure of combined air and gas. The length of exposure of the fruit to the heat or flame is in relation to the temperature used, but I find that good results are obtained with an intense flame applied for a relatively short time, as from five to fifteen seconds, depending somewhat upon the nature and variety of the fruit. With an intense flame, I have found that the oil is more readily liberated from the peel and volatilized, and it is important that this oil be dissipated quickly and without too greatly affecting by heat the structure of the fruit beneath. Also, I have found it desirable to rotate or revolve the fruit during exposure to the heat or flame, in order that the entire surface may receive uniform treatment.

In fact, in the course of my experiments and tests, my preference has been for the use of an overhead gas flame under blast pressure, at a temperature of approximately 1850° F. In this manner, the fruit can be transported through a flame-tunnel on fluted or corrugated iron rollers which revolve as they progress forward, thus also revolving the fruit for uniform heat treatment of the entire surface. The size of this tunnel may vary with the kind of citrus fruit being treated. With oranges of medium size, the tunnel may be about 24 to 30 inches in length, about 12 inches in width and about 4 to 5 inches in height above the surface of the transporting rolls. The sides and roof of the tunnel would be formed of firebrick or refractory material, with holes for the gas flames or burners in the roof so that the flame may be directed upon the fruit passing on the rollers below. In a specially constructed furnace of this nature, I have found a timing of six to eight seconds about right for oranges of medium size and with a skin or peeling of moderate thickness. The fluted rollers for transporting the fruit through the flame are attached to endless chains, all of which may be immersed in a tank of water below for cooling after each trip through the furnace. This furnace and mechanism, however, is no part of the herein patent, which is intended to cover only the process of treatment. The means of heat or flame treatment is incidental and may be carried out as desired, and the time of exposure to the heat or flame will vary with the temperature. Also, in any given temperature, the duration of heat treatment will vary with the kind of citrus fruit and also perhaps with the season, the variety and nature of the orange, grapefruit or other citrus fruit, some having thin peels and some having thick peels with a different content of moisture and also of oil. In actual practice, the proper time for ideal results is readily determined by testing each lot or variety.

Upon emerging from the heat or flame, the blistered and softened outer surface of the citrus fruit may be removed and the fruit cleansed by friction, brush and water as may be desired. However, I prefer to pass the fruit through a trough under the impinging action of rotating jets or sprays of water at a pressure of about 150 pounds, in order that all foreign matter and all of the loosened substance of the peel may be removed. In passing down this trough, which may be about twenty feet in length and 12 to 15 inches in width, and in which the fruit may remain for two to four minutes, the mass of fruit should be constantly moved from below or agitated and kept in motion in order that the entire surface of each orange, grapefruit or lemon shall be thoroughly and repeatedly exposed to the sprays of water, which may come from revolving nozzles above with an opening of about ⅛ inch or smaller. A stationary jet of water at this pressure will rupture the peel and fruit, hence it is important that the jets rotate and that the mass of fruit in the trough be kept constantly in motion.

In order to control the extent of the heat treatment with relation to the effect upon the fruit and peel, I have found it advisable to introduce the fruit into this cooling by water sprays immediately after the fruit emerges from the furnace, as this retards further penetration or action by the absorbed heat. However, in specialized operations, this might be controlled with an interval of time between the heating and the washing, to obtain the desired effect upon the final product.

I am aware that the application of heat and flame has been used for the purpose of removing the skins from pimientos, potatoes and perhaps other vegetables and fruit, but I have no knowledge of flame or heat having been used to remove the oil from the peel of citrus fruits nor to remove the outer surface of the peel together with any accumulated foreign substances. Furthermore, the skin or peel of citrus fruits is of a character altogether different than that of other fruits and vegetables, and the treatment and handling of citrus fruits preparatory to use is therefore regarded in a different classification. For the purposes set forth, I claim that my discovery and invention is new and novel and that it forms the basis of a radically different and valuable practice to the industry.

I claim:

1. A method of heating the peel of citrus fruit to remove the pungent oil and other related matter from the peel and to remove the outer surface portion of the peel with the accumulated foreign matter thereon prior to processing the fruit to obtain the juice, or prior to using the fruit for other purposes, comprising the steps of subjecting the fruit to a heat approximating 1850° F. to blister and char the outer surface portion of the fruit, and then subjecting the blistered and charred outer surface portion of the fruit to an action removing the altered and disintegrated outer surface portion of the peel.

2. A method as defined by claim 1, wherein the fruit is subjected to the action of the heat for a period of time not over fifteen seconds or under five seconds.

3. A method of heating the peel of citrus fruit to remove pungent oil and other related matter from the peel and to remove the outer surface portion of the peel with the accumulated foreign matter thereon prior to obtaining the juice from the fruit, comprising the steps of subjecting the fruit to a heat approximating 1850° F. to blister and char the outer surface portion of the fruit and then subjecting the blistered and charred outer surface portion of the fruit to a water spray under approximately 150 pounds pressure to remove the altered and disintegrated outer surface portion of the peel.

4. A method as defined by claim 3, wherein the fruit is subjected to the action of the water spray for a period of time between two and four minutes.

5. A method as defined by claim 3, embodying the further step of agitating the fruit during the spraying period for the purpose of exposing the entire surface of each piece of fruit to the action of the water spray.

6. A method of heating the peel of citrus fruit to remove the pungent oil and other related matter from the peel and to remove the outer surface portion of the peel with the accumulated foreign matter thereon prior to processing the fruit to obtain the juice, or prior to using the fruit for other purposes, comprising the steps of subjecting the fruit to a heat of not less than 500° F. to blister and char the outer surface portion of the fruit, and then subjecting the blistered and charred outer surface portion of the fruit to an action removing the altered and disintegrated outer surface portion of the peel.

7. A method of heating the peel of citrus fruit to remove pungent oil and other related matter from the peel and to remove the outer surface portion of the peel with the accumulated foreign matter thereon prior to obtaining the juice from the fruit, comprising the steps of subjecting the fruit to a heat of not less han 500° F. to blister and char the outer surface portion of the fruit and then subjecting the blistered and charred outer surface portion of the fruit to a rotary water spray under such pressure to remove the altered and disintegrated outer surface portion of the peel.

8. A method of heating the peel of citrus fruit to remove the pungent oil and other related matter from the peel and to remove the outer surface portion of the peel with the accumulated foreign matter thereon prior to processing the fruit to obtain the juice, or prior to using the fruit for other purposes, comprising the steps of subjecting the fruit to a heat between 1500° F. and 2000° F. to blister and char the outer surface portion of the fruit, and then subjecting the blistered and charred outer surface portion of the fruit to an action removing the altered and disintegrated outer surface portion of the peel.

BAILIE N. SAVAGE.